United States Patent [19]

Davies et al.

[11] 4,423,564
[45] Jan. 3, 1984

[54] TRAPS AND TRAPPING TECHNIQUES

[75] Inventors: Alan R. Davies; Ewen D. M. MacAuley, both of Kimpton; George Harris, Looe; Raymond Baker, Southampton; Philip E. Howse; David A. Evans, both of Eastleigh, all of England

[73] Assignees: The University of Southampton, Southampton; OECOS Ltd., Kimpton, both of England

[21] Appl. No.: 201,393
[22] PCT Filed: Feb. 28, 1980
[86] PCT No.: PCT/GB80/00034
   § 371 Date: Nov. 3, 1980
   § 102(e) Date: Nov. 3, 1980
[87] PCT Pub. No.: WO80/01748
   PCT Pub. Date: Sep. 4, 1980

[30] Foreign Application Priority Data

Mar. 2, 1979 [GB] United Kingdom ............... 7907470

[51] Int. Cl.³ ............................................. A01M 1/10
[52] U.S. Cl. ................................................... 43/121
[58] Field of Search ............... 43/98, 112, 114, 121

[56] References Cited

U.S. PATENT DOCUMENTS

| | | | |
|---|---|---|---|
| 3,935,662 | 2/1976 | Hamid | 43/112 |
| 4,144,668 | 3/1979 | Darncharnjitt | 43/112 |
| 4,208,828 | 6/1980 | Hall | 43/121 |
| 4,227,333 | 10/1980 | Levinson et al. | 43/121 |
| 4,263,740 | 4/1981 | Hemsarth | 43/121 |

FOREIGN PATENT DOCUMENTS

| | | | |
|---|---|---|---|
| 1607361 | 9/1967 | Fed. Rep. of Germany | 43/112 |
| 2448140 | 4/1976 | Fed. Rep. of Germany | |
| 2650385 | 5/1978 | Fed. Rep. of Germany | 43/112 |
| 2365290 | 9/1976 | France | |

Primary Examiner—Kuang Y. Lin
Assistant Examiner—M. Jordan
Attorney, Agent, or Firm—Young & Thompson

[57] ABSTRACT

Methods of trapping pests and traps therefor, wherein a surface, accessible to pests, is changed, preferably at predetermined time intervals, from a pest-supporting to a pest-dislodging condition, whereby pests on the surface are dislodged into a trapping zone for retention therein. The changes can be effected mechanically, but in the embodiment of a cockroach trap, the surface comprises a pair of inclined, insulating panels (2) with parallel conductors (3) which are pulsed electrically at, preferably, 10–30 second intervals with 300–400 volts DC, sufficient to dislodge pests from the surface on to a sticky insert (5) in a removable tray (4). The voltages are applied to the conductors (3) for not longer than 1 second, pulsing being effected by a multi-vibrator which, with associated circuitry, is contained in an upper portion (7) of a removable cover (8). A suitable pheromone attractant can be used, in a bung or phial (9) between the surfaces, as a lure.

6 Claims, 1 Drawing Figure

U.S. Patent  Jan. 3, 1984  4,423,564
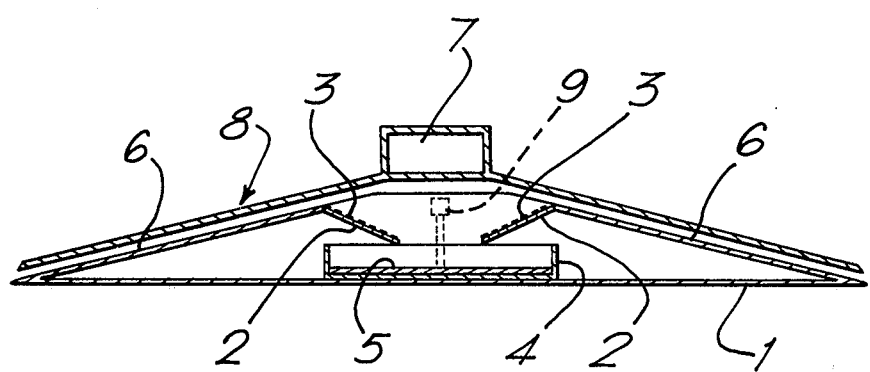

TRAPS AND TRAPPING TECHNIQUES

DESCRIPTION

This invention relates to traps and trapping techniques for trapping pests and is especially, but not exclusively, related to trapping crawling insects, such as cockroaches, for example, Periplaneta americana, Blatella germanica and Blatta orientalis (black beetle) or arachnid pests, such as spiders.

Cockroaches are inquisitive but very wary insects and, as a consequence, are extremely difficult to trap, particularly in sufficient numbers to substantially reduce an infesting colony. Many different types of known cockroach traps are available but are limited in their trapping efficiency due to the instinctively cautious nature of these insects.

Also it has been found that cockroaches are able to sense the presence of local electromagnetic radiation, such as an electric field, under certain circumstances, which phenomenon tends to reduce substantially the trapping efficiency of known electrical cockroach traps.

An object of the present invention is to provide a method of trapping pests, say, insects, such as cockroaches, in sufficiently large numbers to substantially reduce an infesting colony.

Another object of the invention is to provide a trap for trapping pests which is comparatively simple and economical to manufacture, which can be easily transported and handled, and which eliminates the disadvantages, such as the low trapping efficiencies, associated with known traps.

In accordance with one aspect of the invention, there is provided a method of trapping pests comprising:

(a) providing a surface which is accessible to pests and which can be either in a pest-supporting condition or in a pest-dislodging condition;

(b) associating a trapping zone with the surface so as to receive pests dislodged therefrom;

(c) maintaining the surface in the pest-supporting condition and then changing it to the pest dislodging condition, whereby any pest received and supported on the surface is dislodged into the trapping zone; and (d) retaining any such dislodged pest in the trapping zone.

In accordance with another aspect of the invention, there is provided a pest trap comprising a surface which can be changed from a pest-supporting condition to a pest-dislodging condition, a trapping zone associated with the surface for receiving pests dislodged therefrom and pest-retaining means associated with the trapping zone.

The pests may be dislodged from the surface either mechanically or electrically. Also, an attractant may be used to lure the insect or other pest on to the surface. Such an attractant could be in the form of food or, in the case of an insect, such as a cockroach, a pheromone attractant could be used.

In order that the invention may be more fully understood, a preferred form of cockroach trap will now be described by way of example and with reference to the accompanying drawing which shows a cross-sectional elevation of the trap.

As shown in the drawing, a cockroach trap comprises a substantially triangularly cross-sectioned housing 1, with opposed inclined surfaces 6 each leading to a respective, inwardly extending and downwardly inclined, cockroach-receiving surface formed from an electrically insulating panel 2 upon whose upper surface are located spaced, parallel strip conductors 3. Beneath the lower edges of the panels 2 is located a trapping zone in the form of a removable tray 4 with a sticky insert 5 positioned therein.

The conductors 3 are connected to an electrical multivibrator circuit (not shown) housed in the upper portion 7 of a cover 8 for the trap. Between the cover and surfaces 6 is defined a gap along which cockroaches can crawl to the inwardly extending and downwardly inclined surfaces. The multivibrator circuit causes alternate conductors 3 to be pulsed for a period of not more than 1 second, at predetermined time intervals of 10 seconds, with 300–400 volts DC. However, alternate conductors 3 can be pulsed with voltages of 100 volts to 1 kilovolt at predetermined time intervals of 1 second to 1 minute, but preferably 10 seconds to 30 seconds, depending upon the type of cockroach to be trapped, the infestation and such other factors that need to be taken into consideration to obtain maximum trapping efficiency. It has been found that the preferred operating voltage is from 300 volts to 500 volts.

In operation of the trap, any suitable cockroach attractant, such as a synthetic pheromone, is located between the two panels 2 at the centre of the trap. Any cockroaches in the vicinity of the trap will be lured by the attractant and crawl up one of the opposed sides under the cover 8 and on to the respective cockroach-receiving surface provided by the panel 2 and conductors 3. It will be appreciated that the 300–400 volt DC pulses are spaced by 10 second intervals in order to permit as many cockroaches as possible to collect on the panels 2 between pulses.

As the conductors 3 are pulsed with 300–400 volts DC, the cockroaches on the panel 2 are dislodged by the consequential current flow that they provide between adjacent conductors and fall into the tray 4 where they stick to the insert 5. Subsequently, the tray 4 can be removed from the trap so that the insert 5, with the cockroaches stuck thereon, may be removed from the tray for disposal.

It is to be understood that the electrical dislodging means, comprising the panel 2, the conductors 3 and the electrical circuit, could be replaced by a pulsed mechanically-movable surface, whereby movement of the surface, preferably in a downward direction at predetermined time intervals dislodges any cockroaches, or other insects or pests therefrom. Of course, other suitable trapping zones, instead of the removable tray and sticky insert, could be used, for instance, a box or cage.

Also, it should be appreciated that the pulsing of the surface from the pest-receiving condition to the pest-dislodging condition is not intended to kill the pests but merely to dislodge them from the surface into the trapping zone where they subsequently die or where they are removed for extermination and disposal. Although the trap has been described in relation to the substantial reduction of an infesting pest colony, it can also be used for monitoring purposes.

Suitable synthetic pheromone attractants for luring certain types of cockroach on the dislodging surfaces of the trap are listed as follows:

PERIPLANETA AMERICANA

Germacrene D; 1-methyl-5-methylene-8-(2-propyl)-cyclodeca-E,1-E,6-diene:

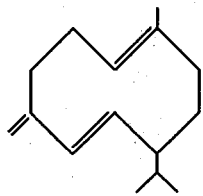

or periplanone-B;8-methylene-5-(2-propyl)-11-oxabicylco [8,1,0] undec-E,6-en-3-one-2-spirooxiran:

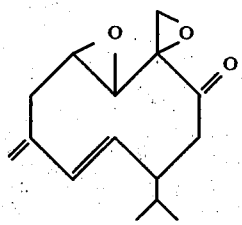

BLATELLA GERMANICA

Propyl cyclohexylacetate of the formula:

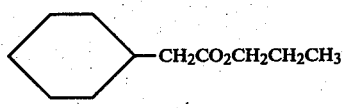

or 3,11-dimethyl-2-nonacosanone of the formula:

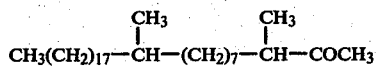

The particular attractant is provided in the trap in a bung or phial 9 which is supported between the surfaces, as shown in dashed outline in the drawing.

The trap can be made in any size, according to the size of the pest to be trapped therein.

Connections between the conductors 3 and associated circuitry in the upper portion of the cover may be in the form of a plug and socket connector, such a connection having a safety arrangement, whereby, when the cover is removed, the high voltage circuit is isolated from its mains supply and also cannot be touched by an operator.

We claim:

1. A pest trap comprising a surface which can be changed alternately from a pest-supporting condition to a pest-dislodging condition at predetermined time intervals, a trapping zone associated with the surface for receiving pests dislodged therefrom and pest-retaining means associated with the trapping zone, wherein the changing of said surface between said pest-supporting and pest-dislodging conditions, at said predetermined time intervals, is sufficient only to dislodge pests from the surface into the trapping zone, the surface being operable electrically between the pest-supporting and pest-dislodging conditions, the surface comprising electrical conductors between which an electric potential can be applied only to dislodge pests from the surface and not to kill said pests, the trap comprising a housing of substantially triangular cross section with opposed inclined surfaces each leading to a respective, inwardly extending and downwardly inclined cockroach-receiving surface in the form of electrically-insulating panels upon whose upper surfaces are disposed said electrical conductors and beneath whose lower edges is located a trapping zone in the form of a removable tray with a sticky insert positioned therein.

2. A trap as claimed in claim 1, wherein the electric potential can be applied between the electrical conductors at a predetermined time interval of 1 second to 1 minute.

3. A trap as claimed in claim 2, wherein the predetermined time interval is 10 seconds to 30 seconds.

4. A trap as claimed in claim 1, wherein the electric potential is applied to the electrical conductors for a predetermined time period of not greater than 1 second.

5. A trap as claimed in claim 1, wherein the trap has a pest attractant associated therewith.

6. A trap as claimed in claim 5 for crawling insects or arachnid pests, wherein the attractant is a pheromone.

* * * * *